(12) United States Patent
Müller

(10) Patent No.: US 11,454,948 B2
(45) Date of Patent: Sep. 27, 2022

(54) METHOD FOR ANALYZING THE STATUS OF AN ELECTROMECHANICAL JOINING SYSTEM AND ELECTROMECHANICAL JOINING SYSTEM FOR CARRYING OUT THE METHOD

(71) Applicant: Kistler Holding AG, Winterthur (CH)

(72) Inventor: Alexander Müller, Lorch (DE)

(73) Assignee: Kistler Holding AG, Winterthur (CH)

( * ) Notice: Subject to any disclaimer, the term of this patent is extended or adjusted under 35 U.S.C. 154(b) by 0 days.

(21) Appl. No.: 17/270,640

(22) PCT Filed: Sep. 12, 2019

(86) PCT No.: PCT/EP2019/074385
§ 371 (c)(1),
(2) Date: Feb. 23, 2021

(87) PCT Pub. No.: WO2020/058087
PCT Pub. Date: Mar. 26, 2020

(65) Prior Publication Data
US 2021/0365002 A1    Nov. 25, 2021

(30) Foreign Application Priority Data
Sep. 21, 2018 (EP) .................... 18195998

(51) Int. Cl.
*G05B 19/4065* (2006.01)
*G01L 5/24* (2006.01)
*G05B 23/02* (2006.01)

(52) U.S. Cl.
CPC ............ *G05B 19/4065* (2013.01); *G01L 5/24* (2013.01); *G05B 23/0264* (2013.01)

(58) Field of Classification Search
None
See application file for complete search history.

(56) References Cited

U.S. PATENT DOCUMENTS

2007/0182359 A1    8/2007   Wahler
2009/0089033 A1    4/2009   Ringering et al.

FOREIGN PATENT DOCUMENTS

DE         20305789 U1      6/2003
DE        102007038890      2/2009
(Continued)

OTHER PUBLICATIONS

Written Opinion of International Searching Authority and Translation, 8 pages.
(Continued)

*Primary Examiner* — Carlos R Ortiz Rodriguez
(74) *Attorney, Agent, or Firm* — Dority & Manning, P.A.

(57) ABSTRACT

An electromechanical joining system that uses an output force or output torque for performing a joining method and includes an electrical drive connected for driving a screw drive and is configured for generating actual values of force or torque that are provided as input variables to a monitoring device. The system includes a sensor configured for measuring the course of the forces or torques over time during the joining method and for detecting additional measurement values that are supplied to the monitoring device as input variables. Wherein the monitoring device links the supplied actual values with the supplied additional measurement values to detect upcoming wear of a wear-prone component of the electromechanical joining system. A method for analyzing the status of the electromechanical joining system is also disclosed.

18 Claims, 4 Drawing Sheets

(56) References Cited

FOREIGN PATENT DOCUMENTS

| | | |
|---|---|---|
| DE | 102014110507 | 1/2016 |
| JP | H-04176526 | 6/1992 |
| JP | 2009-039813 | 2/2009 |
| JP | 2018-508847 | 3/2018 |
| WO | WO2005124488 A1 | 12/2005 |
| WO | WO2016205846 A1 | 12/2016 |

OTHER PUBLICATIONS

International Search Report and Translation, dated Dec. 10, 2019, 6 pages.
Written Opinion of the Search Authority and Translation, dated Dec. 10, 2019, 6 pages.
Translation of JP Office Action, dated Jun. 1, 2022, 7 pages.

METHOD FOR ANALYZING THE STATUS OF AN ELECTROMECHANICAL JOINING SYSTEM AND ELECTROMECHANICAL JOINING SYSTEM FOR CARRYING OUT THE METHOD

CROSS-REFERENCE TO RELATED APPLICATIONS

The present application claims priority to patent application serial number PCT/EP2019/074385, filed on Sep. 12, 2019, which patent application is hereby incorporated herein in its entirety by this reference for all purposes.

FIELD OF THE INVENTION

The present invention relates to a method for analyzing the status of an electromechanical joining system, particularly for detecting upcoming variations that may lead to failure of the electromechanical joining system. The invention further relates to an electromechanical joining system designed for carrying out the method according to the invention.

BACKGROUND OF THE INVENTION

A method for analyzing the status of an electrical drive for controlling axes in the context of a technical process is known from WO2005124488A1, which corresponds to US Patent Application Publication No. 2007-0182359, which patent application is hereby incorporated herein in its entirety by this reference for all purposes. The prior art process is used for example in an electrical automation system and serves to monitor wear-prone components, such as a brake, a gear, a belt drive, a bearing, a screw drive, a guide element and the like. In particular, the prior art process is used to identify imminent wear on the above-mentioned components at an early stage. In this way, it is for example possible to replace the component in question at a time where a failure of the electrical automation system is accompanied by low costs, for example in usual maintenance intervals or during production stops of the electrical automation system. For this purpose, the known process according to the above-cited document proposes to use a monitoring device for the processing of actual values of the electrical drive and, if necessary, additional measurement values that are detected using sensors. The measurement values are processed by an algorithm and are displayed on a suitable display device, for example.

The applicant of the present invention is a manufacturer of electromechanical joining systems, as documented in data sheet No. 2160A_000-764d-02.17. Electromechanical joining systems are used in automated joining processes. The electromechanical joining system comprises an electrical drive including an electronically commutated servo motor and a screw drive. The screw drive translates a rotary movement of a drive shaft of the servo motor into a linear movement. For this purpose, the screw drive comprises a threaded spindle and a spindle nut. At one end of the spindle nut is attached a ram for holding tools. The electromechanical joining system comprises components that are prone to wear, such as a brake, a gear, a belt drive, the screw drive, bearings, a guide for the spindle nut, an anti-rotation device of the ram, etc. The rotary movement of the drive shaft is recorded by an absolute value encoder enabling the ram to be positioned with high precision. A force sensor detects a time course of forces and torques prevailing during the joining processes.

OBJECTS AND SUMMARY OF THE INVENTION

It is the object of the present invention to detect wear on components of an electromechanical joining system at an early stage so that a failure of the electromechanical joining system can be substantially avoided.

The present invention relates to a method for analyzing the status of an electromechanical joining system wherein an output force or an output torque for a joining method carried out by the electromechanical joining system is generated by an electrical drive by means of a screw drive; and wherein a monitoring device is supplied with actual values of the electrical drive as input variables; wherein additional measurement values are determined by a sensor, which sensor serves to measure force or torque curves over time during the joining method; the additional measurement values are transmitted to the monitoring device as input variables; wherein the monitoring device uses an algorithm to link the actual values with the additional measurement values; and wherein the monitoring device uses this link to detect imminent wear and tear of a wear-prone component of the electromechanical joining system.

The method according to the invention for analyzing the status of an electromechanical joining system comprising the features described herein has the advantage that it provides the detection of imminent wear and tear of a component of the electromechanical joining system in a particularly simple way. For this purpose, the teaching of the present invention proposes to detect the additional measurement values required for carrying out the status analysis by means of a sensor that which measures force or torque curves over time while the joining process is carried out, and to use the algorithm of the monitoring device for linking the actual values with these additional measurement values.

In other words, this means that the algorithm of the monitoring device links actual values of the electrical drive (such as e.g. current intensity, rotational angular speed of a drive shaft and the like) with additional measured variables (force or torque) measured by the sensor in the electromechanical joining system. This linkage or ratio, respectively, is also regarded as the efficiency of the electromechanical joining system.

Typically, it is a characteristic feature of imminent wear and tear of a component of the electromechanical joining system that an increased current intensity is required, for example, to achieve a particular amount (of force or torque) as compared to a new or run-in condition. Now, as soon as the linkage or ratio, respectively, mentioned in the beginning between the actual values of the electrical drive and the additional measurement values in the electromechanical joining system falls below or exceeds a certain ratio, this ratio may be interpreted and utilized as an alert notification to signal that a wear-prone component of the electromechanical joining system is subject to imminent wear or that the component has to be replaced, respectively.

Advantageous embodiments of the method according to the invention for analyzing the status of an electromechanical joining system are described herein.

An electromechanical joining system in the context of the present invention is basically understood to mean any device configured for effecting a joining process. In particular, this is also intended to mean an electromechanical joining system for performing joining operations such as pressing, screwing, forming such as for example riveting, clinching, rolling, caulking, flanging, pressing or pressure joining of components.

In a preferred variation of the hitherto generally described method according to the invention it is considered that the actual values and additional measurement values are used by the algorithm only during part of the time the joining process takes, wherein preferably the actual values are at least nearly constant during the period of time used by the algorithm. The rationale underlying this preferred variation is that fluctuations, for example in power consumption of the electrical drive or in rotational angular speed of a drive shaft of the electrical drive, may occur particularly in the beginning and at the end of the joining process. In contrast, the actual values of the electrical drive are typically at least nearly constant and show no peaks during an intermediate phase of the joining process. Particularly, it is intended that the algorithm should enable the filtering or smoothing of any fluctuations that may occur during the time period used so that these fluctuations are optionally not included in the calculation. It is for example also conceivable to average measurement values that show a linear change with time during the period to be used or to calculate a mean value therefrom, respectively.

While the method described in the preceding paragraph enables the detection of the required status variables during the joining method or during operation of the electromechanical joining system, an alternative implementation of the method provides that the actual values and the additional measurement values are used by the algorithm during an additional operation outside of the joining process, in particular during an operation of the electromechanical joining system where the electromechanical joining system is not subjected to force or torque. In other words, this means that the actual values and the additional measurement values are detected during an "idle stroke" of the electromechanical joining system without any impact on an output end of the electromechanical joining system. Furthermore, it is also conceivable to carry out this "idle stroke" during the return movement phase of an output element of the electromechanical joining system until the next component is joined so that no additional time is required.

Furthermore, for determining an upcoming trend or imminent wear in the electromechanical joining system it is also important to detect the actual values and additional measurement values at the same time (i.e. concomitantly) so that the algorithm links actual values and additional measurement values to one another that are transmitted to the monitoring device at the same time.

As already described above, it is particularly advantageous to use the actual values and additional measurement values at a constant rotational angular speed of the electrical drive.

It may be envisaged that the actual values of a rotary movement of a drive shaft of the electrical drive acting on the screw drive and/or the actual values of the electrical drive are registered in the form of the power consumption of the electrical drive. Usually, both the rotary movement of the drive shaft and the power consumption of the electrical drive may be monitored or determined using relatively simple sensors.

To be able to early recognize an emerging trend or an imminent wear of a wear-prone component of the electromechanical joining system it is essential that the monitoring device calculates or evaluates a time course of the linkage between the actual values and the additional measurement values. In other words, this means that a suitable means of display, for example in the form of a graph on a screen or in numerical representation, enables the representation of a trend with regard to the linked measurement values that occurs during the operating time of the electromechanical joining system.

The variation described in the preceding paragraph is particularly advantageous in the case when the control device extrapolates the time course of the linkage of the actual values with the additional measurement values, i.e. makes a projection into the future. A method of this type particularly allows for the determination of a (safe) remaining operating life of the electromechanical joining system until a worn component must be replaced or enables a conclusion to be drawn as to a potential service life of the component in question, respectively.

In principle, the monitoring device may be arranged in the electrical drive or the monitoring device is located externally of the electrical drive, for example in an external computer. Preferably, the monitoring device is an integral part of a control device of the electrical drive. The external computer may be located anywhere on earth. The actual values of the electrical drive and the additional measurement values from the sensor may then be transmitted in the form of digital data to the external computer via a network such as the Internet.

The invention further encompasses an electromechanical joining system for carrying out a joining method comprising an electrical drive that acts by means of a screw drive on an output element configured for rotary or linear movement. The electromechanical joining system is further characterized by a first means for the detection of actual values of the electrical drive and a second means for the detection of additional measurement values from a sensor for measuring the time course of forces or torques during the joining method. The electromechanical joining system comprises a monitoring device which is supplied by the actual values and the additional measurement values. Furthermore, the monitoring device comprises an algorithm configured to link the actual values and the additional measurement values to one another according to a method of the invention as hitherto described.

In a specific design embodiment of the electromechanical joining system the electrical drive is provided in the form of a servo drive and the servo drive comprises a control device for controlling the electrical drive.

BRIEF DESCRIPTION OF THE DRAWINGS

Other advantages, features and details of the invention are given in the following description of preferred exemplary embodiments referring to the figures in which.

DETAILED DESCRIPTION OF EXEMPLARY EMBODIMENTS

In the figures, the same elements or elements having identical functions are designated by the same reference numbers.

Figure 1:
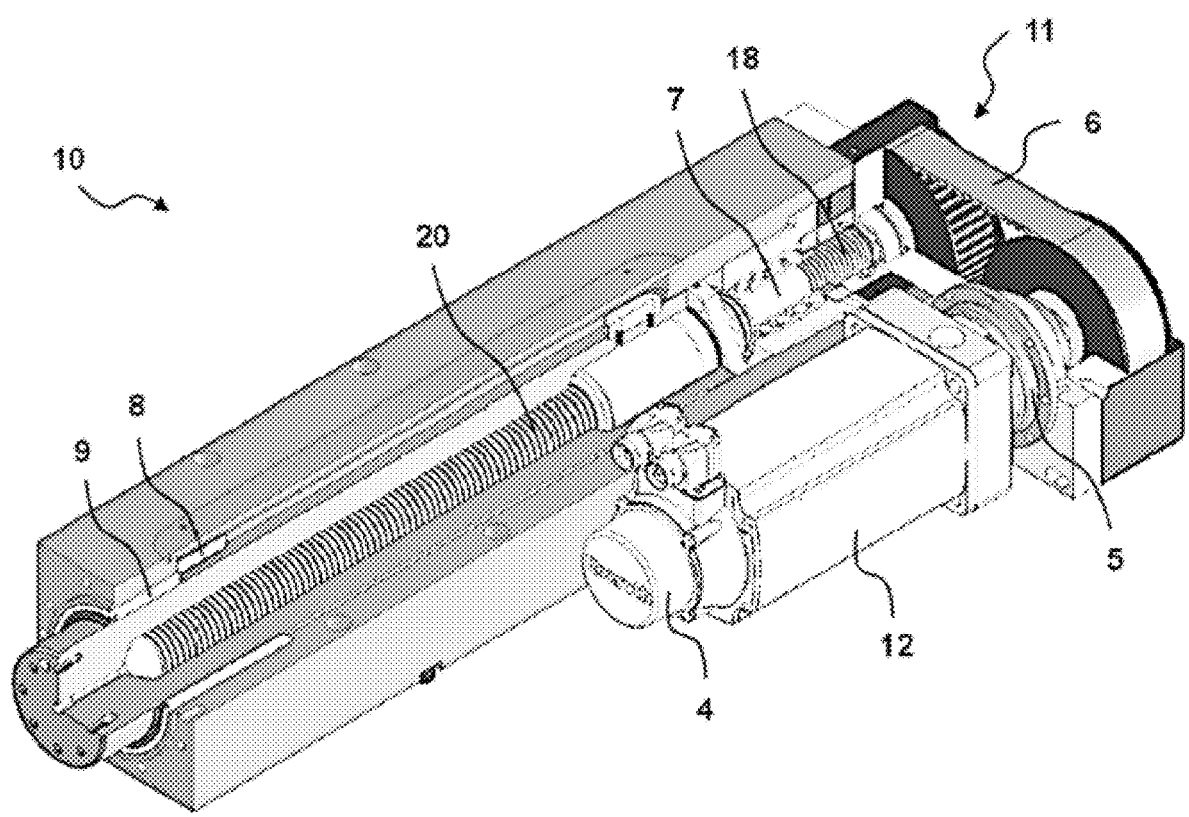
FIG. 1 shows a perspective view of a portion of an embodiment of an electrical drive of an electromechanical joining system for joining two components according to the prior art.
Figure 2:
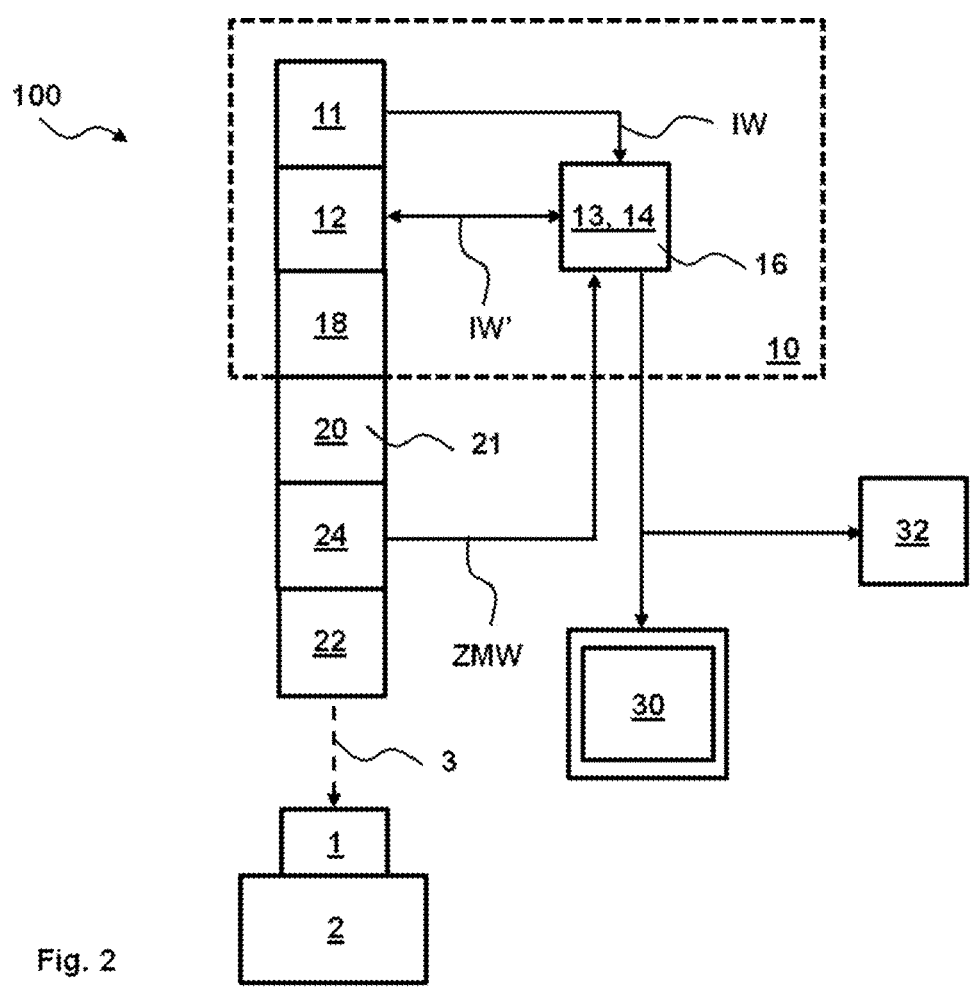
FIG. 2 shows a schematic representation of a first embodiment of an electromechanical joining system for joining two components comprising an electrical drive according to FIG. 1 that is additionally configured with a monitoring device for implementing the method according to the invention integrated in an electrical drive.
Figure 3:
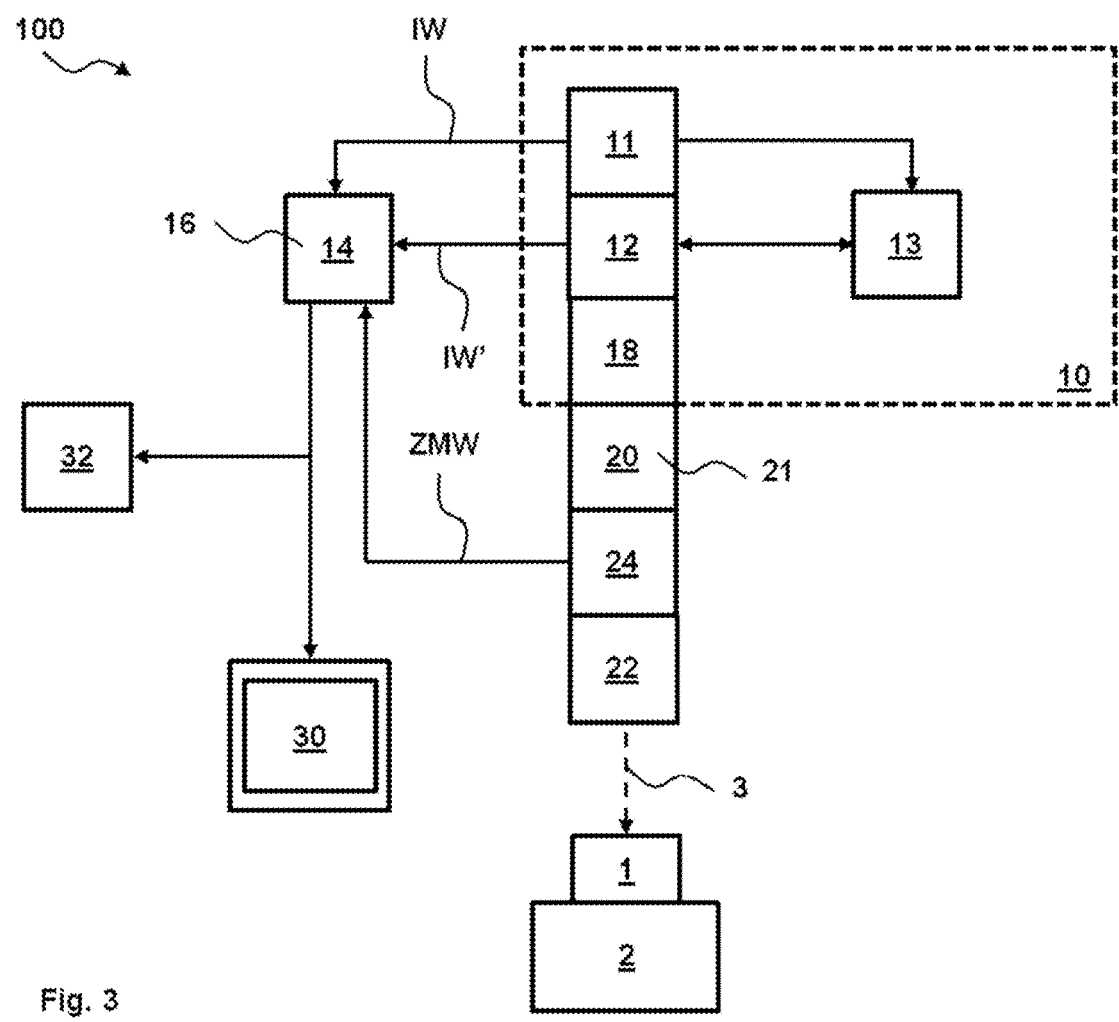
FIG. 3 shows a schematic representation of a second embodiment of an electromechanical joining system for joining two components comprising an electrical drive according to FIG. 1 that is additionally configured with an external control device for implementing the method according to the invention.

Each of FIG. 2 and FIG. 3 provides a schematic representation of a different presently preferred exemplary embodiment of an electromechanical joining system 100 for joining two components 1, 2. FIG. 1 shows a perspective view of a portion of an embodiment of an electrical drive 10 as known in the prior art for an electromechanical joining system 100 for joining two components. Advantageously, the electrical drive 10 comprises a servo motor 12 and a brake 4. The main function of the brake 4 is to hold a ram of the screw drive 20 in a particular position with high precision when the servo motor 12 is in the non-powered mode. Another function of the brake 4 is to decelerate the servo motor 12. Servo motor 12 rotatably drives a drive shaft 18 by means of a gear 5 and a belt drive 6. Drive shaft 18 is rotatably supported by at least one bearing 7. Servo motor 12 rotates the drive shaft 18 in a clockwise or counterclockwise direction with a rotational speed n. An absolute value encoder 11 detects the rotational speed n of the drive shaft 18. Preferably, the absolute value encoder 11 is arranged in close proximity to the brake 4 or the servo motor 12. The absolute value transmitter 11 is not shown in detail in FIG. 1. In light of the present invention it is also possible, however, that the servo motor 12 drives the drive shaft 18 in a gearless or beltless manner.

The electrical drive 10 comprises a screw drive 20. Screw drive 20 comprises a threaded spindle having a spindle nut, an anti-rotation device 8 and a guide 9. The spindle nut is fitted onto the threaded spindle. The threaded spindle comprises an external thread, the spindle nut comprises an internal thread, and the external and the internal thread are made to fit to one another. One end of the drive shaft 18 is non-rotatably connected to the threaded spindle and rotates the threaded spindle. A rotary movement of the threaded spindle results in a linear movement of the threaded nut. Guide 9 guides the threaded nut during linear movement. One end of the threaded nut opposite of the drive shaft 18 comprises a ram. The ram is used for holding the tool; such a tool is not shown in detail in FIG. 1. The anti-rotation device 8 secures the ram against rotation.

FIGS. 2 and 3 are schematic representations of two embodiments of an electromechanical joining system 100 for joining two components 1, 2 in a greatly simplified manner. As an example, the electromechanical joining system 100 is to be used for pressing a first component 1 in the direction of the arrow 3 into an opening of a second component 2 up to a specific position.

The electromechanical joining system 100 comprises an electrical drive 10 as shown in FIG. 1. The electrical drive 10 is controlled by a control device 13. Advantageously, the electrical drive 10 is a servo drive comprising a servo motor 12 and the control device 13 is a servo amplifier. The control device 13 is a computer. A double arrow in FIGS. 2 and 3 indicates that the servo motor 12 is controlled by the control device 13. A rectangular box in dashed line outline in FIGS. 2 and 3 schematically indicates the housing of the electrical drive 10. The housing accommodates the servo motor 12, control device 13, drive shaft 18 and absolute value encoder 11.

In the context of the present invention, wear-prone means that the efficiency of the electromechanical joining system 100 is reduced over the service life of the electromechanical joining system 100, for example, due to abrasion or increasing tolerances between components of the electromechanical joining system 100. This means that for achieving the same result with an output element 22 that is operatively connected to the screw drive 20 and performing the actual joining process, it becomes necessary to increase the input of electrical energy at the electrical drive 10. The output element 22 mentioned above can be a tool that is operatively connected to the first component 1 to be pressed into component 2.

The electromechanical joining system 100 comprises a plurality of wear-prone components 21 such as the brake 4, gear 5, belt drive 6, bearing 7, guide 8, anti-rotation device 9, and the like shown in FIG. 1.

Thus, the way the brake 4 is installed in the housing may be different from that specified in the instruction manual and it may drag during operation leading to increased abrasion of the friction pad. However, brake 4 may also be electrically contacted with the control device 13 in a manner different from that specified in the instruction manual causing excessive braking forces which also result in increased abrasion of the friction pad.

Gearbox 5 contains oil that may age prematurely due to improperly high operating temperatures.

Furthermore, the belt drive 6 shown in FIG. 1 is also subject to wear. Belt drive 6 comprises a belt and belt wheels, which belt wheels are supported by bearings. The belt may be improperly fitted on the belt pulleys leading to increased abrasion of the belt material. The belt pulleys may rotate out of center resulting in premature wear on the bearings.

This may similarly apply to the bearing 7 of the drive shaft 18 shown in FIG. 1. Due to overload or damage, bearing 7 may be subject to premature wear.

Moreover, the guide 8 shown in FIG. 1 may be soiled during operation leading to an increase in frictional resistance on guide surfaces of the guide 8 and resulting in premature wear of guide surfaces.

Finally, the anti-rotation device 9 shown in FIG. 1 is also exposed to high forces during operation and may be subject to premature wear due to overload or damage.

The output element 22 is further operatively connected to a sensor 24 as schematically shown in FIG. 2 and FIG. 3. The sensor 24 is used to determine a force or torque (depending on the type of joining process) that is applied by the output element 22 during the process of joining component 1 to component 2. Sensor 24 may be a strain gauge or a piezoelectric sensor. Sensor 24 may be integrated in the ram or attached to the ram. The amount of force or torque determined by the sensor 24 represents an additional measurement value ZMW and is transmitted as an input variable to a monitoring device 30 by the sensor 24 via the control device 13 as schematically shown in the embodiment depicted in FIG. 2. Alternatively, as schematically shown in FIG. 3, an additional measurement value ZMW is transmitted as an input variable to a monitoring device 30 by the sensor 24 via a monitoring device 14. However, those skilled in the art and being aware of the present invention may also use a sensor that determines a pressure applied by the output element 22.

Another input variable that is supplied from the control device 13 of the servo motor 12 is at least one actual value IW, IW' of the electrical drive 10. One example of an actual value IW is a rotational speed n of the drive shaft 18, and another example of an actual value IW' is a current intensity I required by the servo motor 12.

The actual values IW, IW' of the electrical drive 10 as well as the additional measurement values ZMW of the sensor 24 are determined at the same point of time in the joining process and transmitted to the monitoring device 14.

A monitoring device 14 is provided according to the invention. As shown in FIG. 2, the monitoring device 14 is arranged in the electrical drive 10. Preferably, the monitoring device 14 is an integral part of the control device 13. As shown in FIG. 3, the monitoring device 14 is designed as an external computer located outside the electrical drive 10. The monitoring device 14 comprises an algorithm 16 designed to link actual values IW, IW' of the electrical drive 10 with additional measurement values ZMW of the sensor 24. The result of this linkage is used for performing a status analysis of the electromechanical joining system 100 whereby upcoming wear and therefore imminent failure or required replacement of a wear-prone component 21 is detected at an early time. Preferably, the linkage of the actual values IW, IW' of the electrical drive 10 with the additional measurement values IMW of the sensor 24 is carried out in real time. For the purposes of the present invention, real-time is defined to mean that a result of the linkage is available in the monitoring device 14 in less time than it takes to supply the actual values IW, IW' of the electrical drive 10 and the additional measurement values ZMW of the sensor 24.

Figure 4:
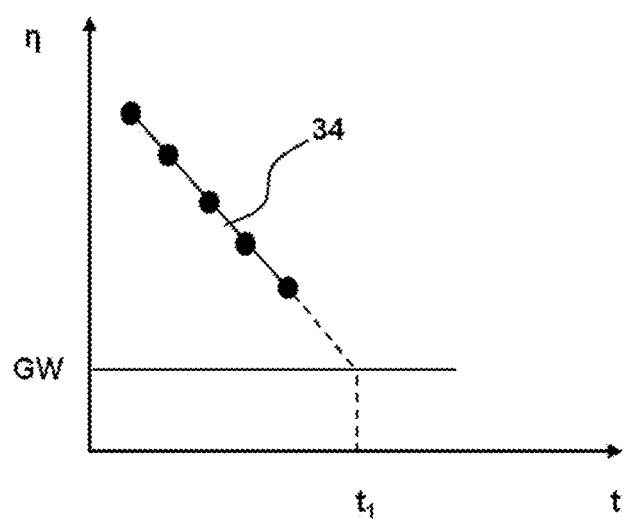
FIG. 4 and FIG. 5 each show representations of a time course of the efficiency or the service life of the electromechanical joining system according to FIG. 2 or 3 as a result of a status analysis carried out by the monitoring device by using an algorithm.

FIG. 4 shows a diagram representing the efficiency η over time t for a longer operation period of the electromechanical joining system 100. For this purpose, the individual time points where the corresponding actual values IW, IW' of the electrical drive 10 and additional measurement values ZMW of the sensor 24 were transmitted to the monitoring device 14 were connected to a curve 34 are schematically represented by the solid black circles. A ratio of the actual values IW, IW' from the electrical drive 10 and the additional measurement values ZMW from the sensor 24 at the respective time points has been calculated by the algorithm 16 and represents the efficiency η of the electrical joining system 100. Moreover, an extrapolation into the future may be seen from the point where the time course of the curve 34 is shown as a dashed line.

In particular, it may be seen that the level of the efficiency η decreases with increasing time t. A threshold value GW identifies a threshold at which it would be advantageous from an economic point of view, for example, to replace a worn component of the electromechanical joining system 100 due to decreasing efficiency η or incipient wear of a wear-prone component 21 before wear and tear would lead to an undesired interruption in operation of the electromechanical joining system 100. The time $t_1$ when the threshold value GW is reached may be extrapolated by the algorithm 16. The time $t_1$ is referred to as the service life of the wear-prone component 21.

Figure 5:
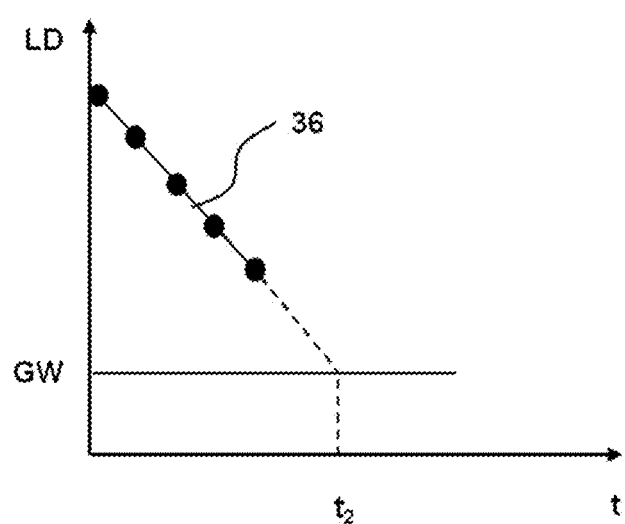

For comparison, FIG. 5 shows a curve 36 representing the expected remaining service life LD of the electromechanical joining system 100 over time t. In this case, the algorithm 16 used the actual values IW, IW' of the electrical drive 10 and the additional measurement values ZMW of the sensor 24 in a service life equation, wherein said service life equation may optionally include further factors or values which may have to be determined using further measurement values or information, respectively.

For example, using the actual values IW of the rotational speed n of the drive shaft 18 measured by the absolute value encoder 11 and additional measurement values ZMW of forces F measured by the sensor 24, a service life LD may be determined according to the following service life equation:

$$LD \sim B^{-\frac{1}{3}} = \frac{\sum_i^m q_i}{\sum_i^m q_i n_i F_i^3}$$

Accordingly, the service life LD is inversely proportional to the third power of an average load B during a number m of uses wherein i is the index of the individual use in operation. A length of time of an operation period is denoted by $q_i$. And $n_i$ represents an average rotational speed measured during an operation period. Finally, $F_i$ is an average force measured during an operation period.

Those skilled in the art and being aware of the present invention may use a different service life equation. Thus, a service life $LD_{10}$ achieved when 90% of the wear-prone components have been used. Also in this case is:

$$LD_{10} = K_{10} B^{-\frac{1}{3}}$$

Alternatively, a service life $LD_5$ achieved by 95% of the wear-prone components may be used. Wherein $K_{10}$ and $K_5$ are experimentally determined proportionality factors.

Also in this case shown in FIG. 5, the algorithm 16 may calculate in advance a critical threshold value GW and a time $t_2$ when the threshold value GW will be reached. The time $t_2$ is referred to as the service life of the electromechanical joining system 100.

The curves 34, 36 shown in FIGS. 4 and 5 may be for example displayed on a display device 30, in particular a screen, connected to the monitoring device 16 schematically shown in FIG. 2 and FIG. 3. Furthermore, it is possible to store the shape of the curves 34, 36 or the numerical values given by the shape of the curves 34, 36 as well as the corresponding actual values of the electrical drive 10 or additional measurement values of the sensor 24 by means of a storage medium 32 schematically shown in FIG. 2 and FIG. 3. Preferably, the storage medium 32 is a transducer electronic data sheet (TEDS) in accordance with standard IEEE 1451.4.

The method described above may be altered or modified in a number of ways without departing from the spirit of the invention.

LIST OF REFERENCE NUMERALS 1 component
2 component
3 arrow
4 brake
5 gear
6 belt drive
7 bearing
8 anti-rotation device 9 guide
10 electrical drive
11 absolute value encoder
12 servo motor
13 control device
14 monitoring device
16 algorithm
18 drive shaft
20 screw drive
21 wear-prone component
22 output element
24 sensor
30 display device
32 storage medium
34 curve shape
36 curve shape
100 electromechanical joining system
LD service life
GW threshold value
t time
$t_1$ calculated service life of wear-prone component
$t_2$ calculated service life of electromechanical joining system or screw drive
IW actual value of rotational speed of drive shaft
IW' actual value of current intensity of servo drive
ZMW additional measurement value
$\eta$ efficiency

The invention claimed is:

1. A method for analyzing the status of an electromechanical joining system wherein an output force or output torque for a joining method carried out by the electromechanical joining system is generated by an electrical drive by means of a screw drive, the method comprising the steps of:
supplying actual values of the electrical drive as input variables to a monitoring device that uses an algorithm;
using a sensor to determine additional measurement values from the course of forces or torques over time during the joining method;
supplying the monitoring device is supplied with the additional measurement values as input variable;
wherein the monitoring device uses the algorithm to generate a linkage between the actual values with and the additional measurement values; and
wherein the monitoring device uses this linkage to detect upcoming wear of a wear-prone component of the electromechanical joining system.

2. The method according to claim 1, wherein the algorithm uses the actual values and the additional measurement values only during part of the time period taken to perform the joining method.

3. The method according to claim 1, wherein the algorithm uses the actual values and the additional measurement values during an additional operation outside of the joining method.

4. The method according to, claim 1, wherein the actual values and additional measurement values from which a linkage is generated by the algorithm are the actual values and additional measurement values that are transmitted to the monitoring device at the same time.

5. The method according to claim 1, wherein the algorithm calculates an efficiency from the ratio of the actual values and the additional measurement values.

6. The method according to, claim 1, wherein the algorithm uses actual values and additional measurement values during a constant rotational angular speed of the electrical drive.

7. The method according to, claim 1, wherein the algorithm uses amounts of a rotary movement of a drive shaft of the electrical drive acting on the screw drive as the actual values or the algorithm uses amounts of the power consumption of a servo drive of the electrical drive as the actual values.

8. The method according to, claim 1, wherein the monitoring device calculates a time course of the linkage of the actual values and the additional measurement values.

9. The method according to claim 8, wherein the monitoring device extrapolates the time course of the linkage of the actual values and the additional measurement values into the future.

10. The method according to claim 8, wherein the monitoring device determines an amount of time remaining until the at least one wear-prone component of the electromechanical joining system must be replaced or a service life of the electromechanical joining system, respectively.

11. The method according to, claim 8, wherein the results of the linkage of linking the actual values with the additional measurement values are stored in a storage medium of the electromechanical joining system.

12. An electromechanical joining system comprising:
an electrical drive that acts by means of a screw drive on a rotatable or linearly movable output element for performing a joining method,
a first means of detecting actual values of the electrical drive;
a sensor for detecting additional measurement values by for measuring the course of forces or torques over time during the joining method, and
a monitoring device configured for receiving the actual values and the additional measurement values,
wherein the monitoring device includes an algorithm configured to generate a linkage between the actual values and the additional measurement values according to a method as defined in claim 1.

13. The electromechanical joining system according to claim 12, further comprising a control device; wherein the electrical drive includes a servo motor connected to the control device; and wherein the control device is configured to control the electrical drive.

14. The electromechanical joining system according to claim 12, further comprising a storage medium connected to the monitoring device and configured for storing the linkage of the actual values with the additional measurement values that is generated by the monitoring device.

15. The electromechanical joining system according to, claim 12, wherein the monitoring device is arranged in the electrical drive.

16. The method according to claim 2, wherein the actual values are at least nearly constant during that part of the time period.

17. The method according to claim 1, wherein the algorithm uses the actual values and the additional measurement values during an additional operation outside of the joining method, in which additional operation no force or torque acts on the electromechanical joining system.

18. The electromechanical joining system according to claim 12, wherein the monitoring device is positioned outside the electrical drive.

* * * * *